United States Patent [19]

Nussbaum et al.

[11] Patent Number: 4,918,292
[45] Date of Patent: Apr. 17, 1990

[54] PROCESS AND MACHINE FOR THE WELDING TOGETHER OF PLASTIC PARTS PROCESSING A BUILT-IN WINDING

[75] Inventors: Max Nussbaum, Ermont; Eric Federspiel, Saint Gratien, both of France

[73] Assignee: Gaz de France, Paris, France

[21] Appl. No.: 387,424

[22] Filed: Jul. 28, 1989

Related U.S. Application Data

[63] Continuation-in-part of Ser. No. 210,457, Jun. 23, 1988, abandoned.

[30] Foreign Application Priority Data

Jul. 15, 1987 [FR] France .................................. 8709941

[51] Int. Cl.$^4$ ...................... B29C 65/34; B29L 31/24; F16L 47/00
[52] U.S. Cl. .................................. 219/492; 219/497; 219/535; 219/544; 285/286
[58] Field of Search ............... 219/490, 492, 494, 497, 219/535, 505, 544; 285/286, 292; 364/477

[56] References Cited

U.S. PATENT DOCUMENTS 3,005,080 10/1961 Bletz ..................................... 219/491
4,323,526 4/1982 Hilbush III ............................ 264/36
4,401,884 8/1983 Kusonoki et al. .................... 219/492
4,602,148 7/1986 Ramsey ................................ 219/535
4,684,789 8/1987 Eggleston ............................. 219/497

FOREIGN PATENT DOCUMENTS

2572326 10/1984 France .
839551 7/1960 United Kingdom ...................... 38/4

Primary Examiner—M. H. Paschall
Assistant Examiner—David Osborn
Attorney, Agent, or Firm—Pollock, Van de Sande & Priddy

[57] ABSTRACT

The invention relates to the automatic welding of plastic parts possessing a built-in winding. In order to carry out an automatic welding operation without risking damaging the parts by subjecting them to an excessive welding temperature, there are regulating means for varying the electrical energy supplied to the winding, in order, during the welding phase, to maintain the temperature of the winding between a minimum temperature, below which welding cannot be carried out, and a maximum temperature, beyond which the parts will be damaged. The invention is used particularly for the production of systems for the distribution of gas under pressure by means of plastic pipelines.

5 Claims, 3 Drawing Sheets

PROCESS AND MACHINE FOR THE WELDING TOGETHER OF PLASTIC PARTS PROCESSING A BUILT-IN WINDING

This application is a continuation-in-part, of Ser. No. 210,457, filed on June 23, 1988 now abandoned.

FIELD OF THE INVENTION

The invention relates to a process and a machine for the automatic welding of plastic parts to one another.

BACKGROUND OF THE INVENTION

It is known that for many uses, particularly for the construction of gas distribution systems, pipes made of plastic, especially polyethylene, are employed more and more frequently.

These pipes cannot be joined together satisfactorily by adhesive bonding, and it is therefore necessary to weld them, more specifically weld them thermally.

A technique practiced more and more involves joining the pipes together by means of sleeves, i.e. fittings or pipe joints, which have an electric winding on their inner face.

The welding operation is carried out by connecting the winding to an electrical supply source which, by the Joule effect, will heat the winding and cause the fusion of the plastic of the sleeve and of the corresponding pipe, thus carrying out the welding.

Other parts, such as branch taps, plugs, etc., are likewise joined to the system on the same principle.

It is also necessary to know that, at the present time, there are several manufacturers of parts, made especially of polyethylene, which are joined together in this way by electric welding.

Each manufacturer has drawn up exact rules for welding his equipment under good conditions.

However, today these rules are often based on a welding technique in which, on the one hand, the only temperature readings taken to assist the smooth progress of the welding operation are those carried out directly on the parts to be welded and, on the other hand, the electrical source supplies to the terminals of the sleeve an energy, that is to say a voltage or a current, which is substantially constant in terms of effective value for the entire duration of the recommended welding time.

As will be appreciated, keeping the winding under a constant voltage (or current) for the entire duration of the heating causes a continuous rise in its temperature, until the welding time has elapsed.

Each manufacturer is therefore obliged to determine accurately the ideal duration making it possible to weld his equipment. Moreover, this welding time must be adhered to strictly in practice on site.

In fact, it was shown that this welding method had various disadvantages which could affect the quality of the weld.

When the adopted welding time is too short, the rise in temperature is insufficient and the weld is of mediocre quality.

When this same time is too long, there is the fear of damage to the plastic which forms the parts to be welded and which is brought to a high temperature, and short-circuits between the turns of the winding can occur.

Furthermore, it was noted that poor preparation of the pipe (irregular or too superficial scraping, etc.) and the presence of play between the pipes to be welded and the sleeve had a considerable influence on the quality of the weld in this case.

Consequently, the current welding technique just described makes it necessary, most of the time, to carry out a correction of the welding time as a function of the initial temperature of the parts to be joined together or to provide a narrow production tolerance on the value of the electrical resistance of the winding of the sleeve.

The object of the invention is to avoid the difficulties which have just been mentioned by enabling the user to carry out the welding under the best possible conditions, in particular without running the risk of damaging the parts to be welded as a result of a rise of the welding temperature beyond the temperature at which the plastic forming these parts is damaged.

SUMMARY OF THE INVENTION

For this purpose, the process of the invention is defined in that, during the welding phase, the temperature at the winding with which the abovementioned fitting is equipped is maintained between a minimum temperature, below which the parts cannot be welded to one another, and a maximum temperature corresponding to the temperature of damage to the parts, for a time interval t in accordance with the equation $$\text{Log}(t) \geq \frac{A}{T} + B$$

where
- t = time during which the temperature of the winding is between $T_1$ and $T_2$ (ie. $T_1 < T < T_2$);
- T = temperature reached by the winding within the above mentioned range of temperature;
- $A = E_D/R$ and $B = \text{Log}(s^2/2D_o)$
- where $E_D$ = Activation Energy for the molecular permeation or diffusion process during the welding (Joule mole$^{-1}$);
- R = Perfect gas constant (R = 8.32 Joule-Kelvin$^{-1}$-mole$^{-1}$);
- $D_o$ = constant of molecular diffusion depending on the structure of the plastic or polymers used;
- $D_o = D/\exp(-E_D/RT)$
- where D is the diffusion coefficient of the polymer molecules during the welding;
- D and $D_o = m^2 \cdot s^{-1}$; and
- s = molecular curvilinear displacement of the polymer molecules during the welding (m).

With this procedure, any risk of excessive heating of the parts to be welded is virtually eliminated, because the welding time is set between a minimum time interval (corresponding to a sufficient rise in temperature to allow the parts to be welded to one another) and a maximum time interval (corresponding to excessive fusion of the parts to be welded). In practice, the difference between these two time intervals is several minutes.

It will also be seen that, if the process of the invention is put into practice, the welding time (that is to say, the time during which the electrical winding will be heated) is no longer a parameter essential for a good quality of the weld and can therefore be selected in such a way that the quality of this weld is scarcely influenced at all either by the preparation of the parts to be joined together (scraping, etc.) or by the play between these parts and the fitting, or even by the initial temperature of these same parts.

Moreover, the process of the invention allows a wider production tolerance on the value of the resistance of the electrical winding and has the advantage that it can easily be applied to existing electrically weldable fitting.

As regards the machine making it possible to carry out the process of the invention, it possesses particularly means for regulating the electrical energy (voltage or current) supplied to the winding, so as to cause the electrical energy to change during the welding phase, in such a way that, at this moment, the temperature at this same winding is between the abovementioned minimum and maximum welding temperatures.

The invention will emerge more clearly from the following description made with reference to the accompanying drawings which illustrate three embodiments of the invention diagrammatically and by way of example.

DETAILED DESCRIPTION OF THE INVENTION

Figure 1:
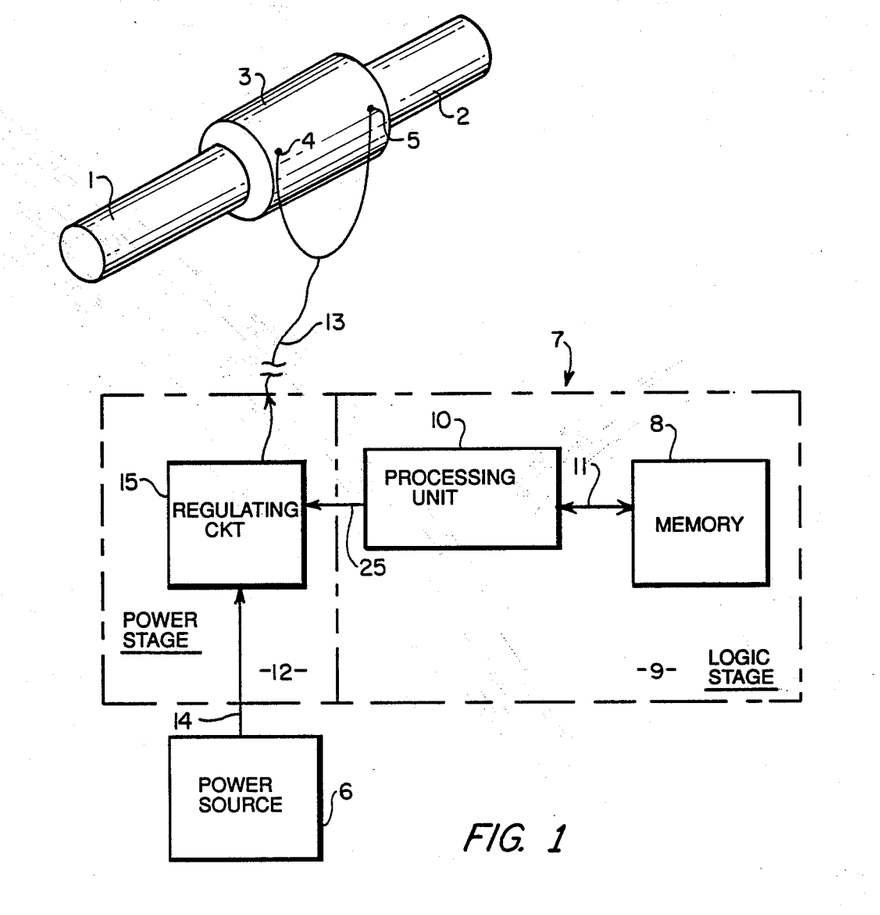
FIG. 1 is a block diagram corresponding to a first embodiment of the invention.

Referring first of all to FIG. 1, this illustrates diagrammatically the two pipe elements 1, 2 made of plastic, for example polyethylene, which are to be joined together by means of a fitting 3, likewise made of polyethylene, which will be thermally welded astride to the ends of the elements 1 and 2 abutting one another.

In a conventional way, the fitting 3 possesses an electrical winding (not shown) in the vicinity of its inner wall, the ends of the winding being accessible via two supply terminals 4 and 5.

In a known way, the thermal welding of the fitting 3 to the elements 1, 2 is carried out by passing between the terminals 4, 5 an electrical energy supplied by a source 6 and calculated exactly for a specific duration, in order to obtain the appropriate rise in temperature of the parts so as to ensure good thermal welding.

These data depend essentially on the parameters of part 3, especially the following parameters: the diameter of the fitting, the thickness of its wall, the resistance of the built-in electrical winding, the length of the fitting, the quality of the plastic, the estimated welding time $t_s$, etc.

As illustrated, these parameters are stored in an internal memory 8 of the logic stage 9 of the machine 7.

However, according to the invention, in order to make it possible, during the welding phase, to maintain the temperature at the winding in the immediate vicinity of the welding interface strictly between minimum temperature $T_1$, below which the parts 1, 2 and 3 cannot be welded to one another, and a maximum temperature $T_2$, corresponding to the temperature of damage or excessive fusion of these same parts, the memory 8 also contains information relating to the value T of the maximum $(T_m)$ permitted winding temperature $(T_1 < T < T_2)$. It will be seen that other data, to which reference will be made later, will also be sorted in the memory 8.

On the basis of the information read in the memory 8 by any known means and transmitted by the wire 11, and as a function of a preset data-processing welding program within the machine, a processing unit 10 will determine, at the logic stage 9, the energy which must be supplied by the power stage 12 to the supply wire 13 of the heating winding between the terminals 4, 5 of the fitting 3.

As illustrated, the electrical energy introduced into the wire 13 via the power stage 12 is supplied by the electrical energy source 6 which can consist, for example, of the electrical current of the network or of a site generator.

More specifically, the source 6 is connected by means of the wire 14 to a unit 15 for regulating the electrical energy (effective voltage U or current I) supplied to the winding, this unit 15 itself being connected to the abovementioned processing unit 10 by means of the wire designated by 25.

Thus, the processing unit 10, in which the settings of the electrical energy to be supplied by machine 7 are determined and which can be controlled by a built-in microprocessor, will be capable of addressing the control signals to the regulating unit 15 of the power stage 12.

Figure 4:
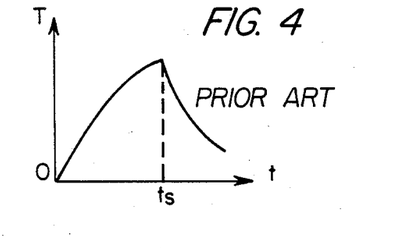
FIGS. 4 and 5 are curves which, according to the process of the prior art, illustrate the trend as a function of time t of the temperature T of the winding and of the electrical energy (voltage U or current I) supplied to this same winding respectively, FIGS. 6 and 7 each show a curve which, according to the process of the invention, represents the trend of the temperature T of the winding as a function of time t, FIGS. 8 to 10 each show a curve representing the trend, as a function of time t and according to the present invention, of the electrical energy (voltage U or current I) supplied to the winding.
Figure 5:
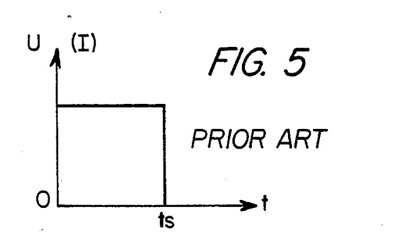

Hitherto, in known welding processes, the supply of electrical energy to the winding has often been such that a constant effective voltage or current has been supplied between the terminals 4, 5 of the latter for the entire welding time $t_s$, that is to say for the entire duration recommended by the manufacturer in order to obtain a "suitable" welding of the parts 1, 2, 3 (see FIG. 5). The rise in temperature of the winding has therefore been continuous during the entire time interval $t_s$ (FIG. 4).

In the invention, the regulating unit 15, under the control of the processing unit 10, will vary and adapt, during the entire welding time $t_s$, the value of the electrical energy which will be supplied to the winding, so that the temperature of the latter is maintained between the abovementioned temperatures $T_1$ and $T_2$ during the welding phase.

In practice, the temperature at the winding in the immediate vicinity of the interface between the parts will be regulated for a time interval t which is such that $$\text{Log}(t) \cong \frac{A}{T} + B \qquad (1)$$

where A and B are constants corresponding to welding parameters to be adapted as a function of the plastic materials used.

To be more specific, constants A and B are actually representative of the following well known equations (2) and (3), from which the equation $\text{Log}(t) \geq A/T + B$ was derived.

$$s^2(t) = 2D \cdot t \quad (2)$$

$$s^2(t) = 2D \cdot t \quad (2)$$

$$D = D_o \exp\left(\frac{-E_D}{RT}\right) \quad (3) \quad \text{ARRHENIUS EQUATION}$$

wherein
- $t$ = time interval (sec.);
- $T$ = temperature (°C.);
- $E_D$ = Activation Energy for diffusion (Joule-mole$^{-1}$);
- $R$ = Perfect gas constant (=8.32 Joule-Kelvin$^{-1}$-mole$^{-1}$);
- $D_o$ = Diffusion coefficient (depending on the particular microstructure of the plastic material);
- $D$ = Translation diffusion coefficient; and
- $s$ = curvilinear displacement.

Equations (2) and (3) are well known and are respectively taught, for example, in the articles entitled "Dynamics Of Entangled Polymer Chains" by deGennes et al. *Amer. Res. Phys. Chem.* Vol. 33 p. 49–61 (1982); and "Polymer Communications" by Fletcher et al., *Polymer Communications*, Vol. 26: January 1985, published by Butterworth and Co. (Publisher Limited). Further, in Section 19.1.1 of the "Handbook of Plastics Test Methods" Third Edition, by Roger P. Brown, published by John Wiley & Sons, Inc., 1988 (First Edition 1971), it is taught that R is the gas constant in the ARRHENIUS equation (3).

The deGennes, et al. publication, per its relevant pages, teaches that the viscoelastic properties of polymers, along a tube, can be associated with equation (2). The Fletcher, et al. publication teaches that the diffusion coefficients of polyethylene-like molecules, when diffusing linearly, are found to obey the ARRHENIUS equation (3).

Thus, by substituting equation (3) into equation (2), the following calculations are obtained:

$$s_2(t) \, 2D_o e^{\left(\frac{-E_D}{RT}\right)} t => \frac{s_2(t)}{2D_o} = e^{(-E_D/RT)} \times t => \quad (4)$$

$$\text{Log}\left[\frac{s^2(t)}{2D_o}\right] = \frac{-E_D}{RT} + \text{Log } t => \boxed{\text{Log}(t) = \frac{A}{T} + B}$$

$$\text{where } A = \frac{-E_D}{RT} \text{ and } B = \text{Log}\left[\frac{s^2(t)}{2D_o}\right].$$

For the present invention, equation (4) has been adapted by the inventors for effecting welding of thermo-weldable plastic elements.

It should be noted that the above mentioned publications only refer to results of physics research which show the temperature dependence of the diffusion coefficient (D or $D_o$) and the dynamic properties of polymers. No application for welding together plastic or polymer materials is described or suggested by these publications.

Figure 11:
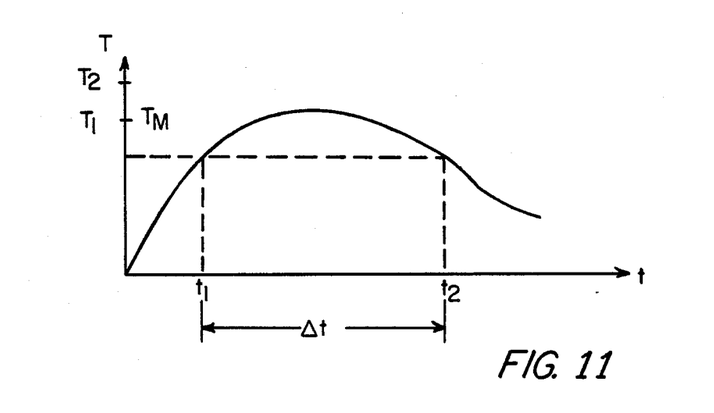
FIG. 11 is a graph which is representative of equation (1).

In such a welding application, equation (4) expresses in fact the minimal time interval t during which the temperature of the welding T is to be maintained between $T_1$ and $T_2$, equation (1)—which illustrates that $\text{Log}(t) \geq A/T + B$; see also FIG. 11—can thus be deduced therefrom.

Thus, for temperature T of the material which is then between $T_1$ and $T_2$, this temperature will be maintained substantially for a time t, so that the molecules at the interfaces of the parts to be joined together shift and become sufficiently interlocked to result in a high-quality weld. A graph representative of the characteristics of equation (1) is shown in FIG. 11.

The winding will therefore substantially obey this law of change during the welding phase.

Figures 6, 7:
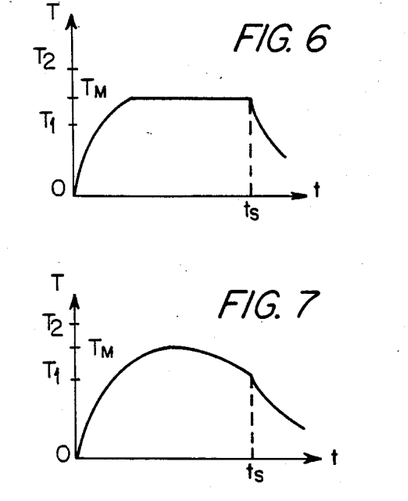

FIGS. 6 and 7 illustrates two characteristic examples of the trend of the temperature of the winding according to the abovementioned law, during the time interval $t_s$.

FIG. 6 shows that the temperature first increases progressively and is then stabilized at a substantially constant specific value between $T_1$ (the limiting welding temperature) and $T_2$ (the temperature of damage of the material), until the time interval $t_s$ has elapsed.

In contrast, in FIG. 7, the temperature increases for a longer duration up to a limiting value, likewise between $T_1$ and $T_2$, after which it decreases progressively up to the end of the time $t_s$.

In practice, three methods of regulating the effective voltage or current supplied to the winding can be adopted.

Figure 8:
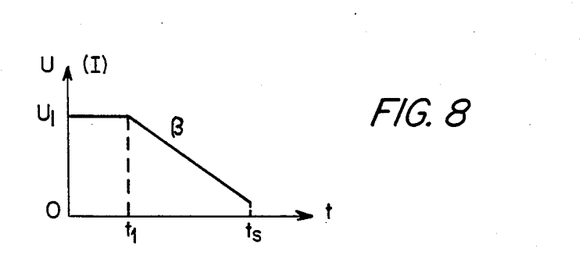
Figure 9:
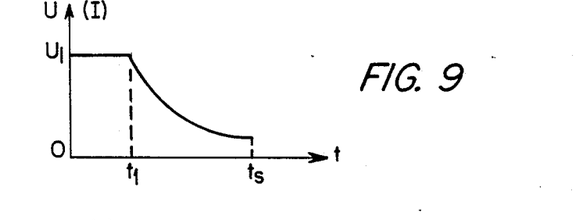

First of all, as illustrated in FIGS. 8 and 9, the processing unit 10 can command the regulating unit 15 first to supply an effective voltage U (or an effective current I) of a substantially constant value $U_1$ for a time $t_1$ (less than $t_s$), and then to cause it to decrease either linearly (FIG. 8) or non-linearly (FIG. 9), until the welding time $t_s$ has elapsed. Of course, if it proved necessary, the time interval $t_1$ could be virtually zero. The value of the energy supplied (U, I) would then be set accordingly.

Figure 10:
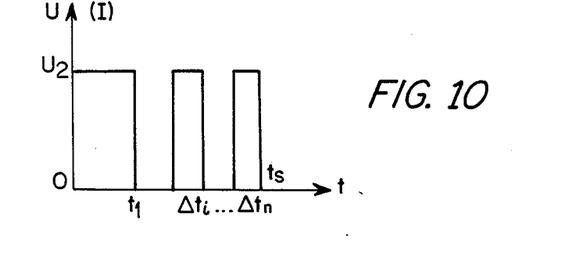

As illustrated in FIG. 10, it is also possible to choose to maintain the effective voltage (or the effective current) supplied to the winding at a, for example, constant value $U_2$ during this same time $t_s$, for specific successive time intervals interspersed with periods when the electrical energy supplied by the source 6 will, in contrast, be substantially zero. There will therefore then be a change in the energy in the form of rectangular pulse trains. If appropriate, the energy levels U, I reached could be different for each pulse train (not shown).

As will be appreciated, the duration of the successive time intervals of each step will be determined and set so as to result in the desired limited temperature of the winding; the same applies to the values $U_1$, $U_2$ and to the gradients and equations of curves representing a decrease in the energy supplied.

Depending on the method used for changing the effective value of the energy supplied to the winding, these data necessary for carrying out the welding will be entered in the memory 8, so that they are taken into account by the processing unit 10. Depending on the particular case, the data will be, in particular, the time $t_1$ during which a substantially constant energy is supplied, the energy fall gradient $\beta$ (see FIG. 8) or the non-linear decrease curve (FIG. 9), or successive time intervals $\Delta t_i$ of each regulating step (FIG. 10).

Figure 2:
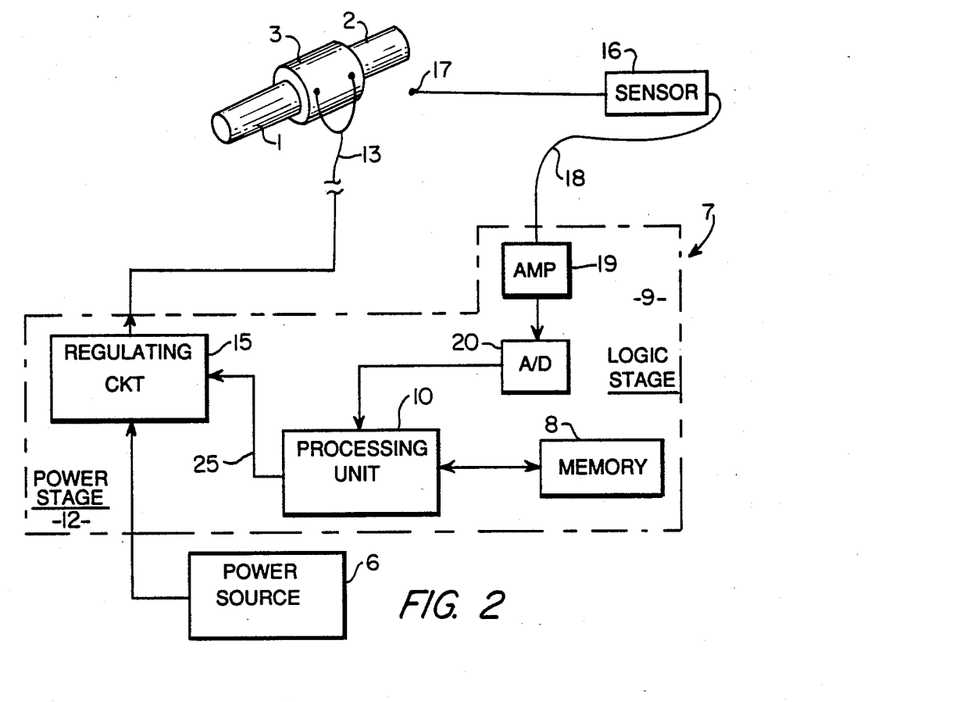
FIG. 2 is a block diagram corresponding to a second embodiment of the invention.

Referring now to FIG. 2, this illustrates another embodiment of the welding machine according to the invention.

This embodiment differs from the preceding one in that there is, in addition, a thermal sensor 16, the temperature pick-up 17 which is put in contact with the fitting 3 in order to determine the effective temperature of the part at the start of welding. The thermal probe 16, which is connected to the machine 7 by means of a cable 18, makes it possible to enter this additional temperature parameter in the logic stage 9 of the machine.

More specifically, the sensor 16 transmits its signals to an amplifier 19, and the amplified signals arrive at a measuring stage 20, such as an analog/digital converter, which applies the corresponding measuring signal to the processing unit 10. On the basis of this measuring signal on the information contained in the memory 8 and transmitted to it, the processing unit 10 is capable of addressing the control signals to the power stage 12 via the abovementioned wire 25.

In this case, the memory unit 8 will store not only the essential data supplied by the manufacturer (diameter of the fitting, resistance of the winding, etc.), but also the necessary information ($t_1$, $t_s$, gradient $\beta$ or $\Delta t_i$, maximum temperature $T_M$ of the winding, etc.) to ensure that the electrical energy supplied to the winding changes during the welding time $t_s$ in the way adopted (see FIGS. 8, 9, 10), in such a way that the temperature at this winding is maintained within the range in question, between the limiting regulating temperatures $T_1$ (lower limiting welding temperature) and $T_2$ (limiting temperature, before damage, of the parts to be welded).

Figure 3:
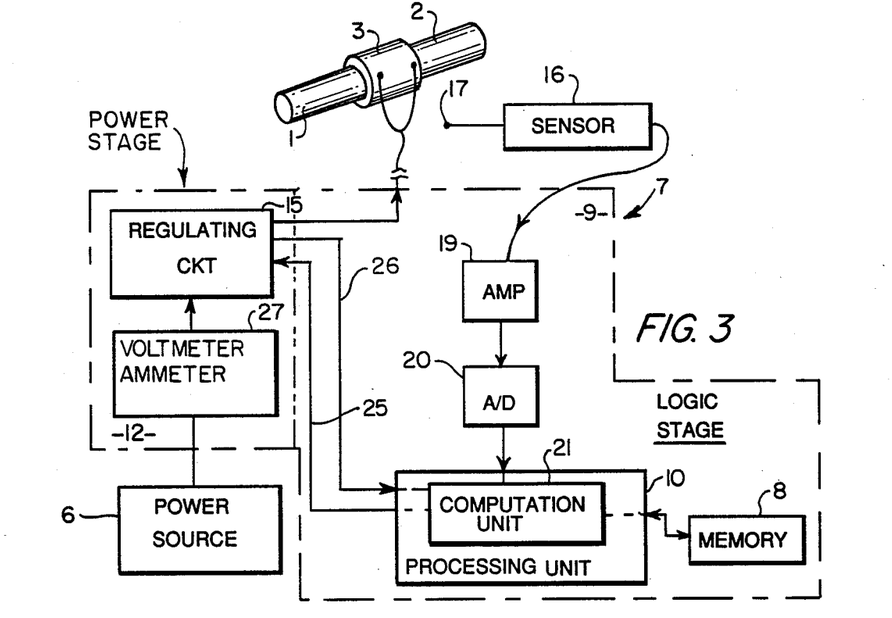
FIG. 3 is likewise a block diagram corresponding to a third embodiment of the invention.

If reference is now made to FIG. 3, a third embodiment of the welding machine 7 of the invention will be seen.

In this alternative version, at a computation unit 21 of the logic stage unit 9, the machine 7 will calculate the temperature T reached by the winding during the welding time $t_s$, in order to adjust the change in the effective value supplied to this same winding, so as to obtain a temperature, limited at the latter, of between $T_1$ and $T_2$.

Such a computation procedure is currently used on such a type of welding machine. The main operations will nevertheless be recalled briefly.

The additional parameter of the temperature $T_0$ of the fitting 3 before welding is first recorded by the sensor 16, and the corresponding information is supplied to the computation unit 21 belonging to the processing unit 10. The electrical resistance $R_0$ of the winding is then calculated. For this purpose, it is possible to use the first values $U_0$ and $I_0$ of the voltage and current supplied at the very start of heating by the source 6 (it will be recalled as a reminder that the resistance $R_0$ is calculated by means of relation $R_0 = U_o/I_o$). These values are recorded, for example, by means of a voltmeter/ammeter 27 and transmitted to the computation unit 21 via the unit 15 by means of the wire 26 making a connection with the logic stage 9. It would also be possible to use the values of the voltage and the current arising from a test conducted before the start of welding on the sleeve 3 which would have been supplied with voltage (or current) of low effective value.

Since the resistance $R_0$ of the winding is known and the memory 8 contains all the data necessary for carrying out the welding and, in particular, in this case the value of the coefficient $\alpha$ of variation in the electrical resistance of the winding is a function of the temperature, the unit 21 of the current stage 9 calculates the temperature T of the winding during welding (it will be recalled that this calculation can be carried out by using the relation $R = R_0[1 + \alpha(T - T_0)]$, that is to say, because of the relation $R = U/I$, $T = 1/\alpha(U/R_0I - 1) + T_0$.

Since the temperature T of the winding during the welding of the parts to one another is known, the machine will in fact be capable of adjusting the change in the effective value of the voltage or current supplied by the source 6 and regulated by the unit 15 of the power stage 12, so as to result in a limited temperature of the winding allowing very high-quality welding of the parts to one another, without the fear of an excessive rise in temperature risking damaging them.

As will be appreciated, the invention is not strictly limited to the embodiments which have just been described.

In particular, a memory 8 outside the machine 7 could have been provided, this memory taking the form, for example, of an identification card (not shown) associated with the parts to be welded. Means for reading this card (optical, magnetic pencil, etc.) would then be provided in order to record the parameters contained in the card and transmit them to the logic unit 9 of the machine.

Likewise, any other type of regulation could be adopted, even though the foregoing description refers only to regulation of voltage or current. In particular, a thermal sensor (such as 16) could have been used, in order, during welding, to record the temperature at the interface of the parts to be welded.

In conclusion, it may be noted that French Patent FR 2,572,326 filed on 18th Oct. 1984 had provided a welding machine having a structure comparable to that just described in terms of the means for processing the information supplied by the memory 8 or, if appropriate, by the probe 16. Since the machine of the invention can be operated by the means described in this patent, discussion of the means for processing is not given herein.

We claim:

1. Method of welding together thermo-weldable plastic pipes by means of a thermo-weldable plastic fitting which receives respective ends of said pipes, comprising the steps of:
   providing an electrical winding heating element around the fitting, said fitting having terminals for connection to a source of electrical current;
   supplying the fitting with electrical current for heating by Joule effect, said current being adjusted for maintaining the temperature of the winding element between a minimum temperature (T1) below which the pipes and the fitting cannot be welded together, and a maximum temperature (T2) corresponding to the temperature which will cause damage to the pipes and the fitting, for a time interval having the relationship $$\text{Log}(t) \geq A/T + B$$

where
   t = time during which the temperature of the winding is between T1 and T2;
   T = temperature reached by the winding within the above mentioned range of temperature;
   $A = E_D/R$ and $B = \text{Log}(S^2/2D_o)$
   where $E_D$ = Activation Energy (Joule mole$^{-1}$);
   R = Perfect gas constant (R = 8.32 Joule, Kelvin$^{-1}$, mole$^{-1}$);
   $D_o$ = constant depending on the structure of the plastic used;
   $D_o = D/\exp(-E_D/RT)$
   where D is the diffusion coefficient;
   D and $D_o = m^2 \cdot S^{-1}$; and
   s = molecular curvilinear displacement (m).

2. Method of claim 1 further comprising the steps of:

sensing the temperature of the fitting during the heating of the winding element; and adjusting the current supplied to the winding element according to the sensed temperature which corresponds to the temperature of said winding element.

3. Method of claim 1 further comprising the steps of:
(a) sensing the temperature of the fitting before heating the winding element;
(b) recording the voltage ($U_o$, U) between the terminals of the winding element and the current ($I_o$, I) from the very start of the heating of said winding element;
(c) calculating the electrical resistance (Ro) of the element on the basis of the recorded values of voltage and current according to the relation $Ro=Uo/Io$;
(d) calculating the temperature of the element according to the relation $$T=1/\alpha(U/R_oI-1)+T_o$$

where
T = temperature of the fitting sensed in step a;
Ro = electrical resistance of the element calculated in step c;
$\alpha$ = electrical resistance variation coefficient of the element;
U and I = voltage and current recorded in step b during the heating of the winding element;
(e) adjusting the electrical current supplied to the element on the basis of the temperature calculated in step d.

4. Method of claim 1 wherein the adjustment of the electrical current comprises the steps of:
setting said current at a specific non-zero value during a first part of the element heating time interval; and
decreasing the value of the current to zero during the remaining time interval.

5. Method of claim 1 wherein the adjustment of the electrical current supplied to the winding element comprises the step of:
maintaining said current at a constant value during specific successive time intervals separated by periods during which said current has substantially zero value.

* * * * *

UNITED STATES PATENT AND TRADEMARK OFFICE
CERTIFICATE OF CORRECTION

PATENT NO. : 4,918,292
DATED : April 17, 1990
INVENTOR(S) : Max Nussbaum, et al.

It is certified that error appears in the above-identified patent and that said Letters Patent is hereby corrected as shown below:

In the title page, change the title of the invention from "PROCESS AND MACHINE FOR THE WELDING TOGETHER OF PLASTIC PARTS PROCESSING A BUILT-IN WINDING" to --PROCESS AND MACHINE FOR THE WELDING TOGETHER OF PLASTIC PARTS POSSESSING A BUILT-IN WIDING--

Column 1, line 3, "PROCESSING" to --POSSESSING--.

Column 2, line 36, change "$A = E_D/R$" to --$A = -E_D/R$--.

Column 3, line 5, change "fitting" to --fittings--.

Column 5, delete the second occurrence of Equation (2).

Column 5, line 45 (Equation 4), "$s_2(t)$" should be --$s^2(t)$-- and "$\frac{s_2(t)}{2D_o}$" should be --$\frac{s^2(t)}{2D_o}$--

Column 6, line 12, change "illustrates" to --illustrate--.

UNITED STATES PATENT AND TRADEMARK OFFICE
CERTIFICATE OF CORRECTION

PATENT NO. : 4,918,292
DATED : April 17, 1990
INVENTOR(S) : Max Nussbaum, et al.

It is certified that error appears in the above-identified patent and that said Letters Patent is hereby corrected as shown below:

Column 7, line 31, delete "unit".

Column 7, line 62, change "current" to --logic--.

Column 8, line 17, change "unit" to --stage--.

Column 8, line 58, change "$A = E_D/R$" to --$A = -E_D/R$--.

Column 9, line 24, change "T" to --$T_o$--.

Signed and Sealed this

Ninth Day of July, 1991

Attest:

HARRY F. MANBECK, JR.

Attesting Officer

Commissioner of Patents and Trademarks